United States Patent [19]

Barton et al.

[11] Patent Number: 4,922,345

[45] Date of Patent: May 1, 1990

[54] PROCESSING OF VIDEO IMAGE SIGNALS

[75] Inventors: Nicholas Barton, Wokingham; Robert Billing, Crowthorne; Hugh K. Littlejohn, Barkham, all of Great Britain

[73] Assignee: Hugh Kendal Littlejohn Questech Limited, Wokingham, England

[21] Appl. No.: 148,611

[22] Filed: Jan. 26, 1988

[51] Int. Cl.⁵ ............... H04N 5/265; H04N 5/275
[52] U.S. Cl. .................................. 358/183; 358/182
[58] Field of Search ............... 358/22, 182, 183, 150

[56] References Cited

U.S. PATENT DOCUMENTS

| | | | |
|---|---|---|---|
| 4,630,101 | 12/1986 | Inaba | 358/22 |
| 4,667,236 | 5/1987 | Dresdner | 358/22 |
| 4,680,643 | 7/1987 | Horiguchi | 358/183 |
| 4,743,970 | 5/1988 | Barnett | 358/183 |

Primary Examiner—Tommy P. Chin
Attorney, Agent, or Firm—Berman, Aisenberg & Platt

[57] ABSTRACT

A control signal synchronized to a digital video signal to be processed and defining the position of a rectilinear line (51,52,53,54) relatively to the image frame (50) is generated by providing an initial value corresponding to the perpendicular distance of the origin (0) of the scanning point of the video raster from the line (51,52,53,54) and incrementing or decrementing this value during movement of the scanning point in accordance with the rates of change of this distance in the horizontal and vertical directions. By logically combining the signals corresponding to a plurality of lines (52,52,53,54) a further signal is obtained which is "true" when the scanning point is within a geometric figure defined by the lines. This signal can provide a "key" signal controlling the display within the figure of image information to be combined with the video signal. Signals relating to four lines (52,52,53,54) forming a quadrilateral can provide coordinate signals for interrogation of a frame store containing image information to be transposed into the area defined by the quadrilateral figure.

12 Claims, 4 Drawing Sheets

PROCESSING OF VIDEO IMAGE SIGNALS

This Application is related to concurrently-filed application Ser. Nos. 148,609, 148,610 and 148,612, the disclosures of which are incorporated herein by reference.

BACKGROUND OF THE INVENTION

This invention concerns improvements in the processing of video image signals to achieve so-called digital video effects.

In such processing, each field frame of a television image is stored as a series of discrete digital values or pixels containing the luminance or chrominance information of the original signal and obtained by sampling the original signal at an appropriate pixel repetition rate. The original signal may be reproduced by scanning the store, or, by addressing the store in appropriately timed relation to synchronising signals defining the television raster, selected image information can be retrieved from the store and displayed on a television screen in any desired position or orientation. Such retrieved information may be combined with other image information to produce a pattern or collage of discrete images, and by moving the boundaries between respective patterns containing the separate picture information, various effects can be achieved, such as the so-called "wipe" effect where one image is progressively replaced for another.

The geometrical pattern within which processed picture information is to appear on the image screen may be computed, for example by a microprocessor, in response to appropriate input controls, and, from output signals from the microprocessor identifying the pattern, it is necessary to derive appropriate control signals to enable the corresponding addressing of the image store and/or the control of image display.

SUMMARY OF THE INVENTION

It is one object of the invention to provide an improved means for generating such a pattern defining control signal.

In some cases it is also necessary to modify the image information appearing within the boundary of a moving pattern, for example to introduce compression and foreshortening of the image when it is desired to give the effect that the image is projected onto a plane that is moving in three-dimensional space.

It is a preferred object of the invention to provide an improved means for enabling such image modifying control signals to be produced.

In accordance with one aspect of the invention, a control signal which varies in timed relation to the synchronising signals defining the raster of a digital television image in order to define a rectilinear edge to appear within the image field is generated by providing at the commencement of scanning of each field a signal value proportional to the perpendicular distance between a point, not necessarily within the image frame, on the corresponding rectilinear line and the origin of the television raster, and incrementing or decrementing this value in accordance with the rates of horizontal and vertical change in the corresponding perpendicular distance of the raster scanning point from the line, whereby the value of the signal tends to zero at the instant when the raster scanning point coincides with the said rectilinear line.

The values corresponding to the initial perpendicular distance and the horizontal and vertical rates of change will be fixed for each field frame, and can be derived from a microprocessor as described above. Thus the perpendicular distance may be represented by a binary number in twos compliment notation, the sign of which indicates on which side of the line the origin of the raster lies. The two rates of change are proportional to the sine and cosine of the direction of the rectilinear line with reference to an arbitrary datum direction, e.g. a vertical or horizontal N S E or W axis with reference to the centre of the image field.

Thus one embodiment of edge signal generating circuit according to the invention may comprise means for storing values corresponding to said perpendicular distance, said horizontal rate of change and said vertical rate of change respectively, a first accumulator associated with means for loading said accumulator with said perpendicular distance value in response to field synchronising pulses and means for incrementing said accumulator by said vertical rate of change value in response to line synchronising pulses, and a second accumulator associated with means for loading said second accumulator with the signal at the output of the first accumulator in response to line synchronising signals and for incrementing said second accumulator by said horizontal rate of change value in response to pulses at the pixel repetition rate.

Thus the output of the said second accumulator provides the desired control signal. It will be appreciated that such a signal will be provided at a resolution much finer than a pixel and can be produced to an arbitary scale by correspondingly scaling the three starting values.

Since the output signal of the single edge generator circuit provides an indication identifying that side of the line on which the raster scanning point lies at any given instant, in terms of the sign of the signal, it is possible in a further development of the invention to identify the area within a geometrical figure bounded by a plurality of edges defined by the signals from corresponding edge generator circuits by processing said signals to derive logical true or false signals determining the relevant sides of each line and logically combining the signals so that the resulting signal is true only when the scanning point lies within the figure.

The invention accordingly further provides, in a preferred embodiment, a correspondingly arranged circuit for deriving so called "key" signals to control the switching between sources of images to lie respectively inside and outside the geometrical figure.

Moreover, in the case of a quadrilateral figure the four edges of which may be considered as representing the four sides of an original television picture and the shape of which may represent the projection onto the viewing screen of the original rectangular picture when displaced from the plane of the screen in three dimensional space, when it is desired to represent a picture image as so displaced, the values of the signals from corresponding edge generator circuits can be utilised to derive coordinate signals by means of which the image information to appear at the corresponding point of the television raster can be derived by addressing a storage and interpolation system containing the original frame of the television picture.

Thus in a further preferred embodiment of the invention a circuit for use in transposing the position, orientation or scale of a picture image within the frame of a television picture comprises four edge signal generator circuits as referred to above, means for providing to such circuits input signals such that the correspondingly defined edges intersect to form a quadrilateral into which the rectangular picture from a stored image frame is to be transposed, and means for deriving signals for the addressing of a storage and interpolation system to retrieve the stored image to be tranposed in terms of the relationship between the signals from respective pairs of edge generator circuits corresponding to opposite sides of the quadrilateral. Such a circuit may further comprise means for deriving compression signals from the signals of said pairs of edge generator circuits and/or for scaling the input signals to said paire of circuit for the correction of perspective in the transposed image.

DETAILED DESCRIPTION OF PREFERRED EMBODIMENTS

Figure 1:
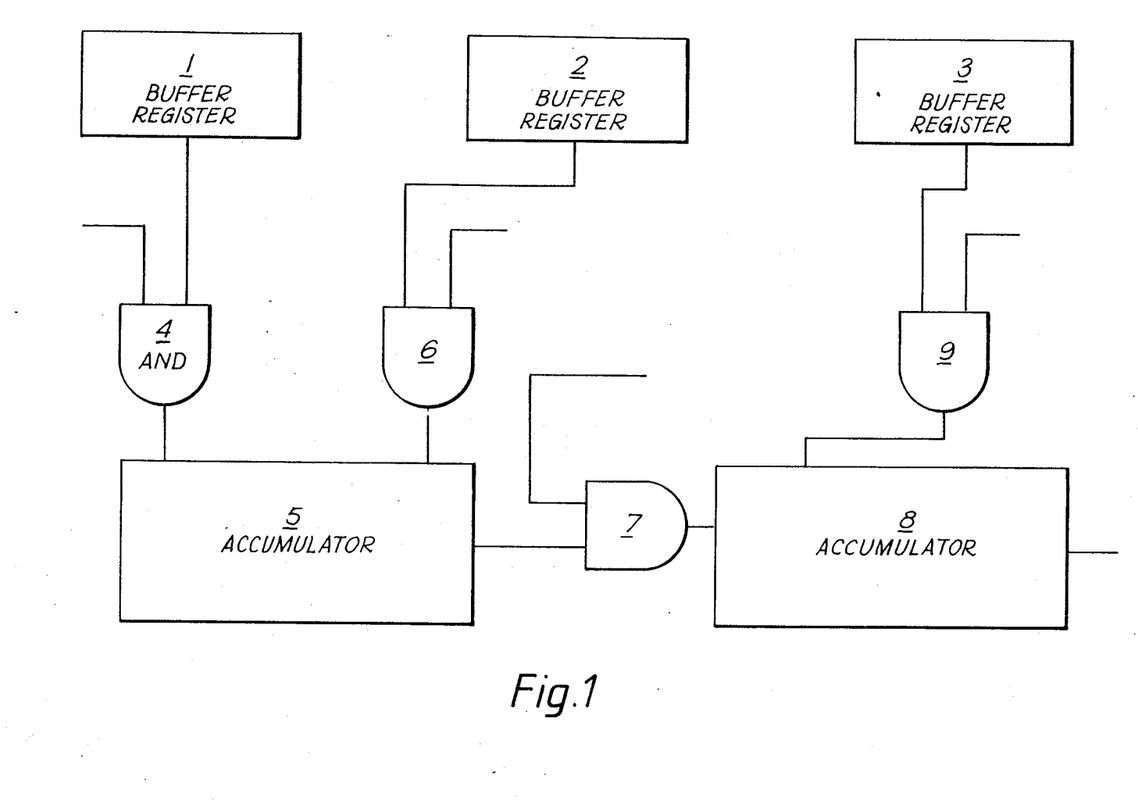
FIG. 1 is a block diagram of an edge generator circuit according to one embodiment of the invention.

Referring to FIG. 1 the edge generator circuit which is illustrated diagrammaticaly comprises three buffer registers 1, 2 and 3 arranged to provide during each field of a video signal corresponding output signals derived from a microprocessor as described below. For simplicity the inputs to the buffer registers are not illustrated.

An output from the first buffer register 1 is coupled via one input of an AND gate 4 to an input of an accumulator register 5. The other input of the AND gate 4 is arranged to receive signal pulses derived from the field pulses of the video signal. The output of the buffer register 2 is likewise coupled by an AND gate 6 to an incrementing input of the accumulator 5, the second input of the And gate 6 being arranged to receive pulses derived from the line synchronising pulses of the video signal. The output of the accumulator 5 is coupled via a further AND gate 7 to a loading input of the second accumulator 8, and the second input of the AND gate 7 is likewise arranged to receive pulses derived from the line synchronising pulses of the video signal.

Figure 5:
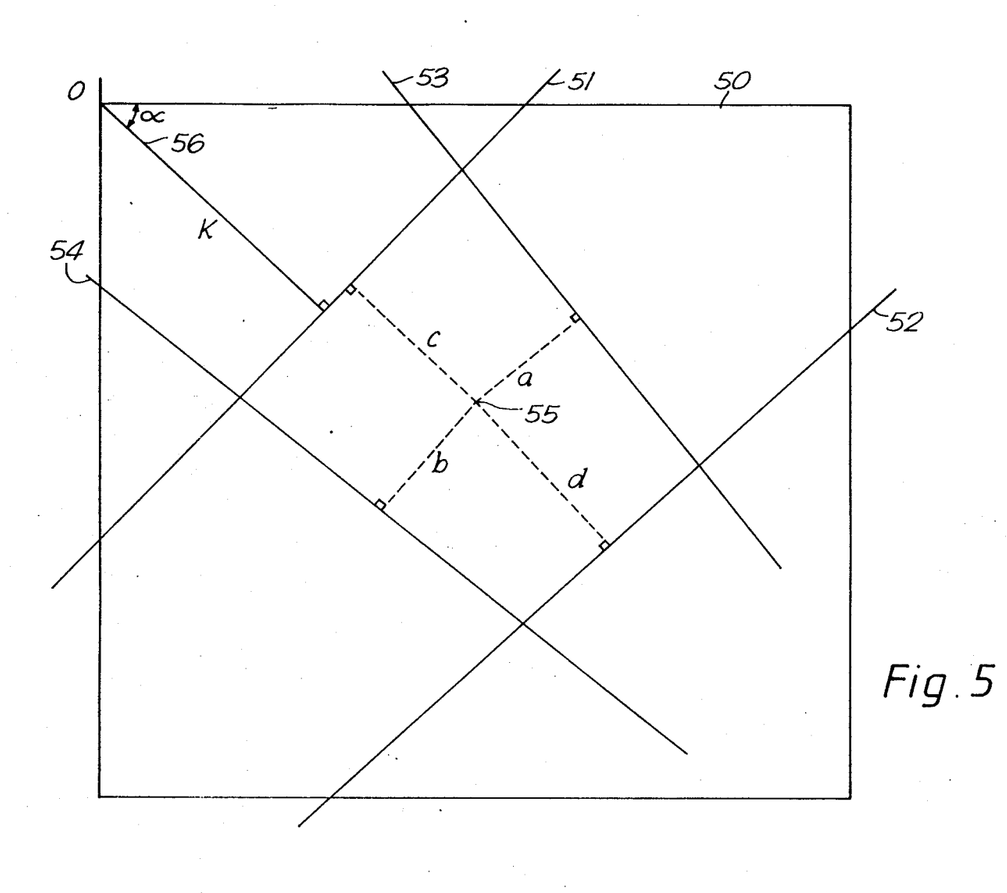
FIG. 5 is a diagram relating to the operation of the circuits of FIGS. 1, 3 and 4.

The manner in which a circuit (as described above) is use to define a rectilinear line within a television picture is described, e.g., in more detail with reference to FIG. 5 of the drawings. In FIG. 5, the rectangle 50 designates the image frame of a television picture and the top left hand corner designated by 0 is accordingly the origin of the scanning raster. Considering a line 51 (shown as intersecting the image frame 50), it will be appreciated that the position and direction of the line 51 can be defined in terms of the length K of a line 56 drawn from the origin 0 perpendicular to the line 51 and the angle formed between the line 56 and the horizontal axis of the image frame. As the scanning point of the raster (defining the image frame 50) moves from the origin 0 in the horizontal direction, the perpendicular distance K between the scanning point and the line 51 will vary proportionally to the cosine of the angle $\alpha$; as the scanning point moves vertically, the distance K will vary proportionally to the sine of the angle $\alpha$. Thus, to produce a signal that may be associated with a video signal to define the position of line 51, the register 1 is caused to hold, during each field of the video signal, a value, in twos complement notation, corresponding to the perpendicular distance K from the top left-hand corner 0 of the video screen to a rectilinear line 51. The registers 2 and 3 are also caused to hold during each field of the video signal, values corresponding to the sine and cosine of the angle a. The output 10 of the accumulator 8 will thus produce a continuously varying signal, the instantaneoous value of which is proportional to the distance of the scanning point of the video raster from the rectilinear line 51, and the sign of which corresponds to that side of the line on which the scanning point of the raster is located. The particular values loaded in registers 1 to 3 (to define any given line) depend upon the particular television standard to be adopted as well as the position and angle of the line to be defined, and the manner in which a microprocessor is programmed to provide these values is readily apparent to any competent computer programmer skilled in the art of providing digital video effects. Suffice it to say that the method of computing such values does not form part of the present invention.

Figure 2:
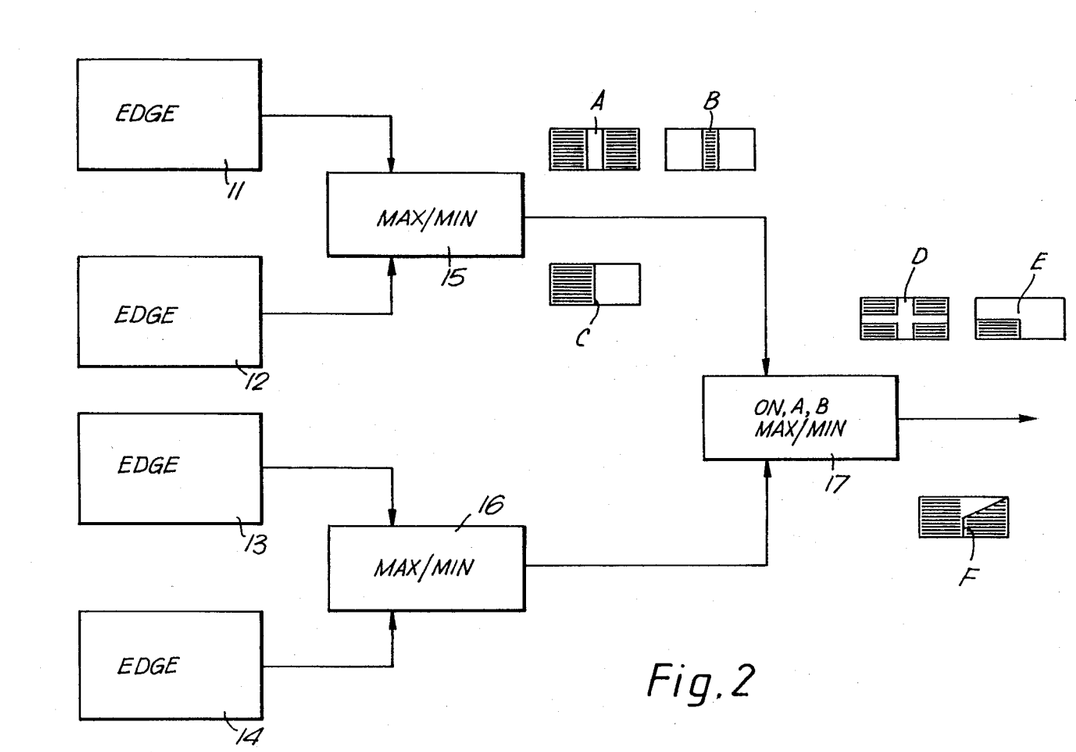
FIG. 2 is a block diagram of a pattern generating circuit incorporating a plurality of circuits as shown in FIG. 1.

Referring now to FIG. 2, there is illustrated a pattern generator utilising four signal generators 11 to 14, of the kind shown in FIG. 1. Associated with the output of each of the edge generators 11 to 14 is a limiter circuit, not illustrated, which has the affect of limiting the number provided as the output signal from the edge generator. For example, all numbers less than zero may be converted to zero, and all numbers greater than 128 may be converted to 128.

Each edge generator and limiter therefore defines an edge across the screen on one side of which it generates an output of zero and on the other side an output of (typically) 128. Near the edge the number produced varies linearly with distance travelled perpendicular to the edge.

The edge generators 11 to 14 are arranged as two pairs of two, and the outputs of the generators 11 and 12, and 13 and 14 forming each pair are combined by a circuit 15 or 16 which can be set to produce either the greater or the lesser of its two inputs. This allows the two outputs of the pairs of generators to be signals which are 'on' (typically 128) either when both edge generators are 'on' or when either edge generator is 'on'. This mechanism can be used to define an area on the screen bounded by two edge generators. The outputs of the two pairs of generators as combined by the circuits 15 and 16 can then be further combined by a circuit 17 which produces as its output one of the following.

1. On (128)
2. First pair of generators
3. Second pair of generators
4. Maximum input value
5. Minimum input value The output of this circuit is then used to address a read only memory not shown which is programmed with a suitable profile for the edge, typically a circular trigonometrical function.

The number produced as output from the read only memory can then be used to control a mixer which cross fades between two video signals.

The control system, e.g. the microprocessor referred to above, may be programmed to supply to the buffers of each edge generator 11 to 14, to effect selected values defining desired positions of edges to appear within the picture image and effect settings of the combining circuits 15, 16 and 17, in order to establish the desired pattern signal to appear at the output of the combiner 17. For example, the setting of each of the combiners 15 and 16 may be such as to define areas of an image screen either between or outside the corresponding rectilinear lines defined by the edge generator circuits, e.g. as shown at A or B in FIG. 2, the lines having any arbitrary position either within or outside of the area of the image screen. Thus only one line might be represented as indicated at C in FIG. 2. The further combination of signals by the combiner 17 then enables more complex patterns to be defined, e.g. as shown at D, E, and F in FIG. 2. Once again, the programming of the microprocessor does not form part of the present invention and is well within the competence of one skilled in the art.

Figure 3:
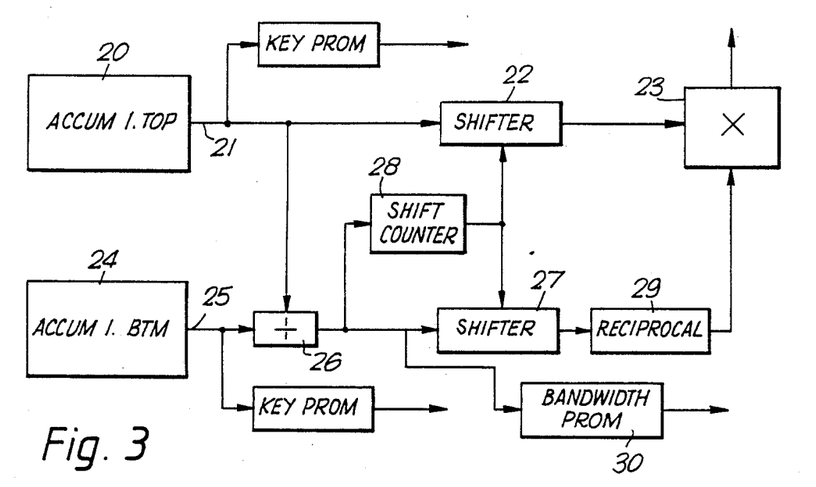
FIG. 3 is a block diagram of an alternative circuit for use in transposing image information.
Figure 4:
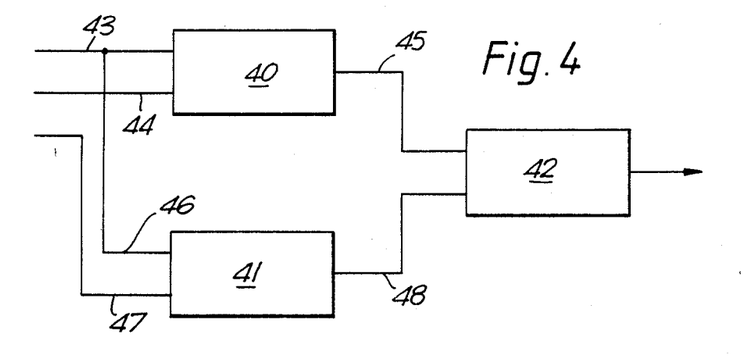
FIG. 4 is a circuit diagram of FIG. 3.

Referring now to FIGS. 3 and 4, a further embodiment of the invention will be described, wherein edge generators of the kind described above are utilised to derive the necessary control signals required to be applied to a store and interpolator system used to produce the effect of rotating a television picture in three dimensional space. In order to achieve such an effect, it is necessary to transpose the position of image information with reference to the coordinates of the original image frame from which it is derived. Thus, it is necessary to coordinate to the synchronising signals of the subsequent image frame addressing signals by means of which the original image information can be recalled and displayed. It also necessary to modify the original image information to introduce the necessary effects of compression and foreshortening, to give the correct impression of perspective as the original image is rotated in space.

The circuit of FIG. 3 enables the output signals of further edge generator circuits to be further processed to derive coordinate information enabling the transposition of the original rectangular image defined within an image frame into the area defined by a quadrilateral figure. Thus, an edge generator circuit 20 which may be considered as defining that rectilinear line of a quadrilateral which is to correspond with the top edge of an original picture image has an output 21 connected to the input of a shifter 22, the output of which is coupled to a multiplier 23. An edge generator circuit 24 the output signal of which is arranged to represent that rectilinear line of a quadrilateral corresponding to the bottom edge of the original image frame has an output 25 connected to one input of an adder 26, the other input of which is also arranged to receive the output signal from the circuit 20. The output of the adder 26 is connected on the one hand to a further shifter 27, and on the other hand to a circuit 28 for performing a shift count, the output of the circuit 28 being connected to further inputs of the shifters 22 and 27. The output of the shifter 27 is provided to the input of a circuit 29 arranged to provide an output signal that is the reciprocal of the input signal, such output being connected to a second input of the multiplier 23. As will be described in more detail below, the output of the multiplier 23 provides an output signal that is the coordinate in the vertical direction of the image information that is to be represented at the corresponding point within the quadrilatereal figure. In addition, the output of the adder 26 is coupled to a further circuit 30 which is arranged to provide a bandwidth limiting signal for the purpose to be described below.

For the purpose of providing the coordinate signal in the horizontal direction, a circuit identical to that of FIG. 3 is utilised, with the exception that the edge generator circuits 20 and 24 are replaced by those edge generator circuits defining the lines corresponding to the left-hand edge and the right-hand edge of the original picture image.

The circuit 29 of FIG. 3 is arranged to provide the reciprocal of its input signal by utilising the input signal to address a read only memory, from the output of which the required reciprocal value is presented. A read only memory storing values to the resolution required in the present context would involve the use of significantly large memory devices. In accordance with a further aspect of the invention, therefore, which may be utilised either alone or in combination with the other aspects of the invention already referred to, a novel combination of memory devices is utilised to provide the required information.

The arrangement of this device is illustrated in FIG. 4, and comprises two separately addressable read only memories 40 and 41, the outputs of which are coupled to respective inputs of an adder 42. By way of example, the input signal received from shifter 27 and in respect of which the stored function is to be determined may comprise a digital value represented by 16 bits which can be split into three sections, typically of 6, 5 and 5 bits counting from the most significant end. The memory 40 may thus comprise a read only memory of 2048 words of 16 bits containing one value in 64 of the required function. The first two sections of the input signal can then be utilised to address the memory 40 via corresponding inputs 43 and 44, in order to derive an appropriate value at output 45, whereas the read only memory 41 comprises 2048 words of 8 bits containing mean differences capable of being addressed via inputs 46 and 47, the 6 most significant bits of the original signal being applied at input 46, and the five least significant bits being applied at input 47. Although shifter 27 is indicated in FIG. 3 as having an output in the form of a single line, the output is in fact in the form of a parallel data bus that can be divided to distribute data between the corresponding inputs 43, 44, 46 and 47 of the read-only memories 40 and 41. The correspondingly derived 8 bit word at output 48 is then combined with the output of memory 40 by means of the adder 42, in order to derive at the output of the latter, the required final function signal. Such an arrangement makes use of the fact that ranges of mean difference values stored in memory 41 can be applied over ranges of the function stored in memory 40 defined only by the higher order bits of the addressing signal in order to derive an approximation of the complete function to a required degree of accuracy, whilst substantially reducing the amount of memory required. Although in the present example this principle has been applied to a reciprocal function, it will be appreciated that the same basic concept could be applied to the storage and retrieval of any appropriate function from a read only memory.

Referring now to FIG. 5, the operation of the system outlined above will be described in more detail.

The image frame within which a transposed picture image is to appear is indicated by the rectangle 50 in FIG. 5, the top left-hand corner of which, indicated at 0 comprises the origin of the scanning point definning the video raster. A quadrilateral figure into which picture information from another field or frame of a video signal is to be transposed is represented by four rectilinear lines 51, 52, 53 and 54, each of which is capable of being represented as the output signal of an edge generator circuit described above. Thus, for example, the line 53 may be considered as being the top edge defined by the signal generator 20 of FIG. 3, and the line 54 as being the bottom edge defined by signal generator 24. When the scanning spot of the video raster 50 is within the quadrilatereal defined by lines 51 to 54, e.g. at a point 55, the vertical coordinate address of the corresponding image information to be presented depends entirely on the ratio of distances of the point 55 from the lines 53 and 54. Therefore, since the circuit 20 will provide the perpendicular distance (a) of the point 55 from the line 53, and the output from the circuit 24 will provide the perpendicular distance (b) of the point 55 from the line 54, the outputs from these circuits can be utilised to compute the address to be given to a storage and interpolation system, as represented by the formula $$K \times a/(a+b)$$

where K is an arbitary constant which depends on the television standard in use.

Referring again to FIG. 3, it will be seen that the appropriate computation is provided by the multiplier 23, which derives the distance (a) from the output of circuit 20, and the reciprocal of the sum of the distances (a) and (b) from the adder circuit 26 and the circuit 29. The corresponding value for the horizontal coordinate address, as determined by the relationship between distances (c) and (d) between the point 55 and the lines 51 and 52 respectively, is determined by a circuit identical with that of FIG. 3, wherein the pair of edge generator circuits are those providing the output signals which define the lines 51 and 52 respectively.

As initially mentioned above, it is not necessary that the output signals from the relevant edge signal generators should be provided to the same scale, since, provided that the values stored in the buffer registers 1 to 3 of FIG. 1 are scaled identically, any arbitrary scale can be utilised without changing the resulting position of the line defined thereby. Advantage may therefore be taken of the possibility of defining the respective distances (a), (b), (c) and (d), with reference to different scales in order to introduce foreshortening of the image in accordance with a required perspective.

This is e.g., achieved within the microprocessor utilised to define the positions of the lines 51 to 54, in the following manner. Since the positions of the corners of the quadrilateral figure defined by the lines 51 to 54 are obtained by computing the positions that the corners of the original frame of the image to be represented therein would occupy when the image frame is displaced and rotated in three dimensional space in a given manner and then projected on to the plane of the image frame 50, it is likewise possible to compute the corresponding positions of the mid-points of each of the sides of the image frame, and then to compute the ratio in which these mid-points divide the sides of the quadrilateral figure in the plane of the image frame 50.

By scaling the starting signal values provided to each pair of edge signal generators in the same ratio, an appropriate correction for perspective can be made. In addition, it is desirable to make a further correction of the relationship between the scales of such initial signals, to avoid an undesirable phenomenon known as "surge" which occurs if the picture is placed in certain orientations. This appears as an oscillation of the picture information about its nominal centre when it is rotated. It can be greatly reduced by applying the further correction computed as follows. Take any pair of opposite edges and compute the ratio of the sines of the angles that they make with either of the other sides. Adjust the ratio of the scaling factors used to set up the two generators for the opposite sides by the new ratio.

It will be appreciated that to transpose an original picture image from a complete image frame into an area such as that defined by the lines 51 to 54, it is necessary to reduce the scale of the original image by an amount which varies in both the vertical and horizontal directions of the original image. In order to avoid so-called "aliasing" errors in the reproduced image, it is further necessary to apply, in known manner, so-called "compression" signals in order to effect a bandwidth correction of the storage and interpolation system utilised for deriving the image information. Since the degree of compression will be a factor defined by the distance between the relevant pair of opposite edges 51, 52, or 53, 54, such a compression signal can be derived as the sum of the distances (a) and (b), or (c) and (d), as the case may be. Thus in FIG. 3, an appropriate compression signal can be provided by the circuit 30 coupled to the output of the adder 26.

From the above description it will be appreciated that, from two identical circuits, each as shown in FIG. 3, the output signals from the multipliers 23 provide the required coordinate signals to enable the addressing, in real time, and in synchronism with the scanning of the image frame 50 of a frame store containing picture image information to be transposed into the quadrilateral defined by lines 51 to 54 of FIG. 5. The outputs of the two circuits 30 provide corresponding compression signals to be associated with the coordinate signals for addressing the store.

An example of a suitable storage and interpolator system enabling the retrieval of image information utilizing such coordinating and compression signals is described in Applicants' concurrently-filed co-pending U.S. patent application Ser. No. 148,609.

Also, on the assumption that the picture information of which the coordinates are derived as described above is to be presented within a visible pattern corresponding to the quadrilateral defined by the lines 51 to 54, which need not necessarily be the case, it is necessary for a so-called "key" signal to be derived which rises and falls smoothly as the scanning point of the video raster passes through each of the lines 51 to 54. In order to provide this signal a circuit is included which offsets the output from each edge signal generator by a controllable amount and then combines the four results to provide a single signal which rises smoothly at a fixed distance from the edge of the picture. A similar circuit can be used to add a border to the picture by generating a similar edge and using it to change between the picture information and a controllable colour. For this purpose a pattern generator having the general arrangement shown in FIG. 2 is employed, with the exception that the signal limiters as described in FIG. 2 are omitted, and the output signals of the four edge generators are logically combined in accordance with the requirement that the four rectilinear lines should define a quadrilateral figure. In addition an arithmetic circuit of which the block diagram is illustrated in FIG. 3 is provided for each pair of edge generator circuits defining opposite sides of the quadrilateral figure.

What is claimed is:

1. An edge signal generating circuit for use in generating a control signal which varies in timed relation to synchronising signals defining a raster of a digital video image to define a rectilinear edge to appear within an image frame, comprising means for storing values corresponding to the perpendicular distance between a point, not necessarily within the image frame, on a corresponding rectilinear line and the origin of the video raster, horizontal rate of change of said distance and vertical rate of change of said distance, respectively, a first accumulator associated with means for loading said first accumulator with said perpendicular distance value in response to field synchronising pulses and means for incrementing said first accumulator by said vertical rate of change value in response to line synchronising pulses, and a second accumulator associated with means for loading said second accumulator with a signal at the output of the first accumulator in response to line synchronising signals and means for incrementing said second accumulator by said horizontal rate of change value in response to pulses at the pixel repetition rate for generating said control signal.

2. A circuit for use in transposing the position, orientation or scale of a picture image within a frame of a television picture comprising four edge signal generator circuits as claimed in claim 1, means for providing to such circuits input signals such that correspondingly defined edges intersect to form a quadrilateral into which a rectangular picture from a stored image frame is to be transposed, and means for deriving signals for of addressing of a storage and interpolation system to retrieve the stored image frame to be transposed in terms of a relationship between the signals from respective pairs of said edge generator circuits corresponding to opposite sides of the quadrilateral.

3. A circuit as claimed in claim 2, further comprising means for deriving compression signals from the signals of said pairs of edge generator circuits and/or for scaling the input signals to said pairs of edge generator circuits for the correction of perspective in a transposed image.

4. A signal generating circuit for use in providing, in association with a digital video signal, a signal that varies in such a manner as to define a rectilinear line with reference to a scanning point of a raster defined by synchronising signals comprising field, line and pixel repetition signals derived from said digital video signal, said circuit comprising first store means for receiving a distance value, second store means for receiving a first rate of change value, third store means for receiving a second rate of change value, first accumulator means, means responsive to said field synchronising signals for causing said first accumulator means to be loaded with said distance value contained by said first store means, means responsive to said line synchronisiing signals for incrementing said first accumulator means by said first rate of change value contained by said second store means, second accumulator means, means responsive to said line synchronising signals for loading said second accumulator means with the value contained by said first accumulator means, and means responsive to said pixel repetition signals for incrementing said second accumulator means by the second rate of change value contained by said third store means, whereby the value contained by said second accumulator is representative of the instantaneous value of the distance between said scanning point and said rectilinear line in a direction perpendicular to the latter.

5. A circuit for use in addressing a frame store containing a digital video image, in real time in association with a digital video signal, to enable image information from said frame store to be represented in a field scanned by a scanning point of a raster defined by synchronising signals of said digital video signal, comprising four signal generating circuits as claimed in claim 4 all arranged to receive the synchronising signals of said video signal, first processing means coupled to outputs of said second accumulators of a first pair of said signal generating circuits, and second processing means coupled to outputs of said second accumulators of a second pair of said signal generating circuits, and first and second processing means each being arranged to process the signal values provided by the corresponding pair of signal generating circuits to provide an output signal corresponding to the coordinate position of said scanning point between boundaries comprising the rectilinear lines defined by said pair of signal generating circuits, whereby said image information from said frame store can be transposed in position and orientation within said field, in accordance with input signals provided to said store means of said signal generating circuits, by addressing the frame store with the output signals of said processing means.

6. A circuit according to claim 5, wherein each said processing means comprises an adder having inputs respectively coupled to said outputs of the said second accumulators of the respective pair of signal generating circuits and having an output providing the sum of the values received at said inputs, a reciprocal circuit having an input coupled to said output of the adder and an output providing the reciprocal of the value received at said input, and a multiplier having a first input coupled to an output of one of said second accumulators, a second input coupled to said output of said reciprocal circuit and an output providing a signal which is the multiple of the values provided at said inputs.

7. A circuit according to claim 6, further comprising means coupled to the output of said adder for deriving a bandwith limiting signal to be applied as a compression signal to an interpolator associated with said frame store.

8. A circuit for use in providing a key signal to be associated with a digital video signal in order to define, in real time in association with said video signal, a pattern within a field of said video signal scanned by a scanning point of a raster defined by synchronising signals derived from said video signal, said circuit comprising a plurality of signal generator circuits as claimed in claim 8 each coupled to receive said synchronising signals, a limiter circuit coupled to an output of each said second accumulator of a said signal generator circuit, and at least one combining circuit coupled to outputs from two of said limiting circuits and arranged to provide a given output signal in response to a signal of a predetermined value received from at least one of said two limiting circuits.

9. A circuit according to claim 8, wherein said at least one combining circuit is switchable to select, as said predetermined value, either the maximum, or the minimum of the values provided by said two limiting circuits.

10. A circuit according to claim 9, comprising four of said signal generator circuits, two said combining circuits coupled to limiters of respective pairs of said signals generator circuits and a further combining circuit having inputs coupled to outputs of said first two combining circuits, said further combining circuit being arranged to provide an output signal of a given value when at least one of said first two combining circuits provides an output signal having a predetermined value.

11. A circuit according to claim 10, wherein said further combining circuit is switchable to select, as said predetermined value, either the maximum, or the minimum of the values provided by said two limiting circuits.

12. A circuit according to claim 11, wherein said further combining circuit is further switchable, to select only the input signal from a corresponding one of said first combining circuits.

* * * * *